United States Patent [19]
Hwang

[11] Patent Number: 5,529,326
[45] Date of Patent: Jun. 25, 1996

[54] ADJUSTABLE SHOCK ABSORBING DEVICE FOR BICYCLE SEAT

[76] Inventor: Tan-Jue Hwang, No. 1, Alley 19, Lane 98-21, Sec. 2, Taichung Kang Road, Taichung, Taiwan

[21] Appl. No.: 378,602

[22] Filed: Jan. 26, 1995

[51] Int. Cl.⁶ .................................................. B62J 1/02
[52] U.S. Cl. ......................... 280/220; 280/283; 280/287; 297/195.1; 297/215.14; 297/215.15
[58] Field of Search ................................... 280/220, 286, 280/287, 283; 297/195.1, 215.14, 215.15

[56] References Cited

U.S. PATENT DOCUMENTS 4,108,462  8/1978  Martin ...................................... 280/286
5,364,160  11/1994 Fritschen et al. ...................... 297/195.1

Primary Examiner—Mitchell J. Hill
Attorney, Agent, or Firm—Bacon & Thomas

[57] ABSTRACT

Vertical and longitudinal shocks imparted to a bicycle seat are absorbed by a compression spring disposed between the seat and the seat strut, with one end of the spring being mounted to a seat retainer that is moveably secured to a pair of slide plates which are in turn slidably engaged with a stationary strut head. A semi round seat secured to the strut head permits the angle of inclination of the bicycle seat to be adjusted. The compression strength of the spring may also be adjusted by urging a cover towards and away from the moveable end of the spring.

2 Claims, 5 Drawing Sheets

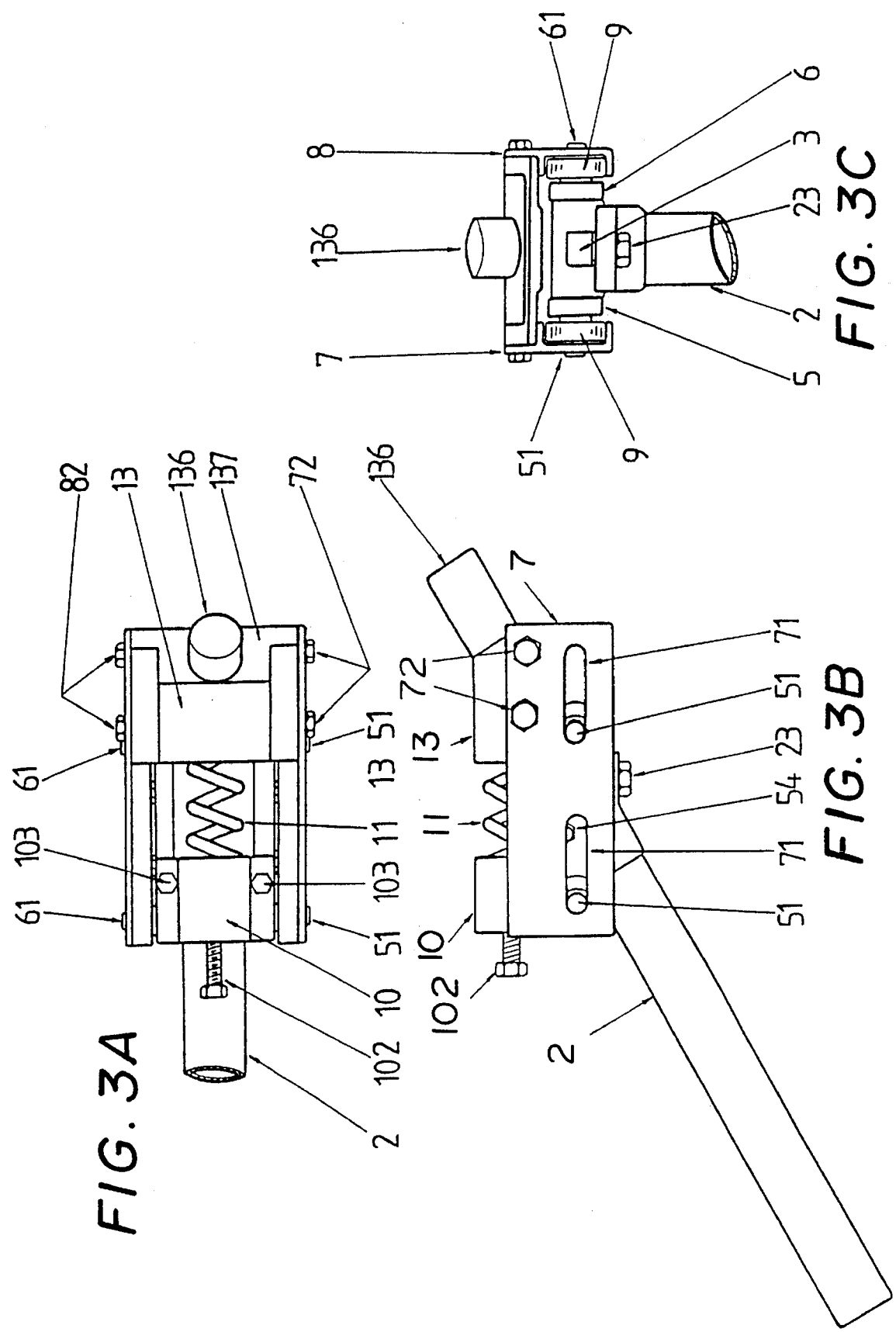

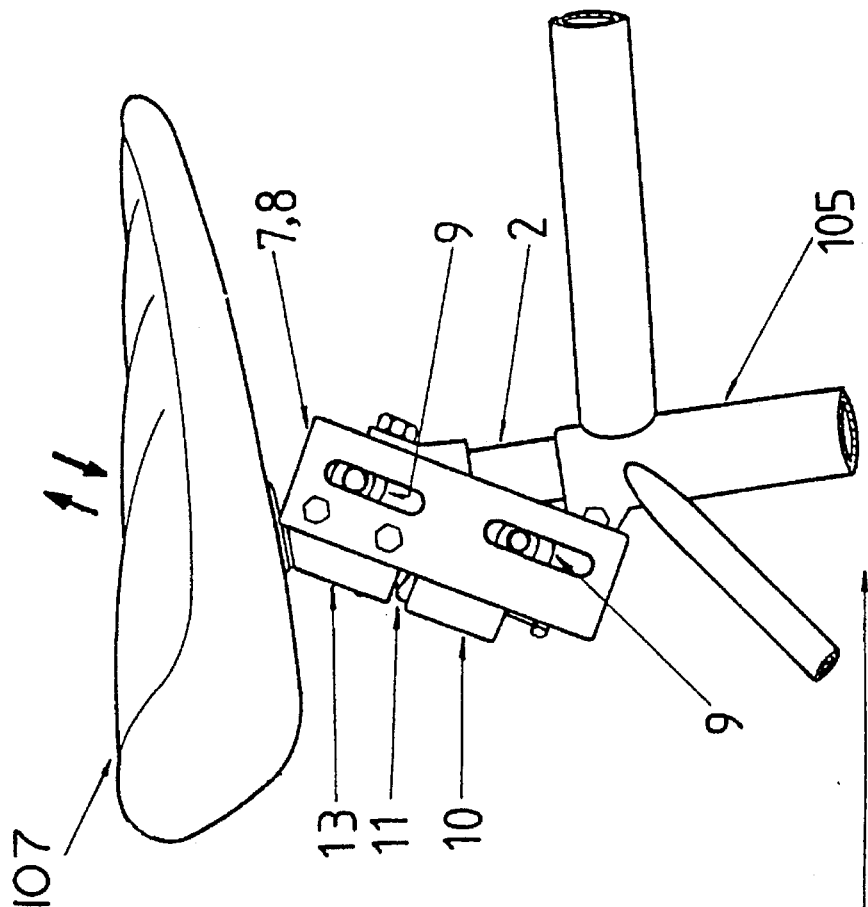
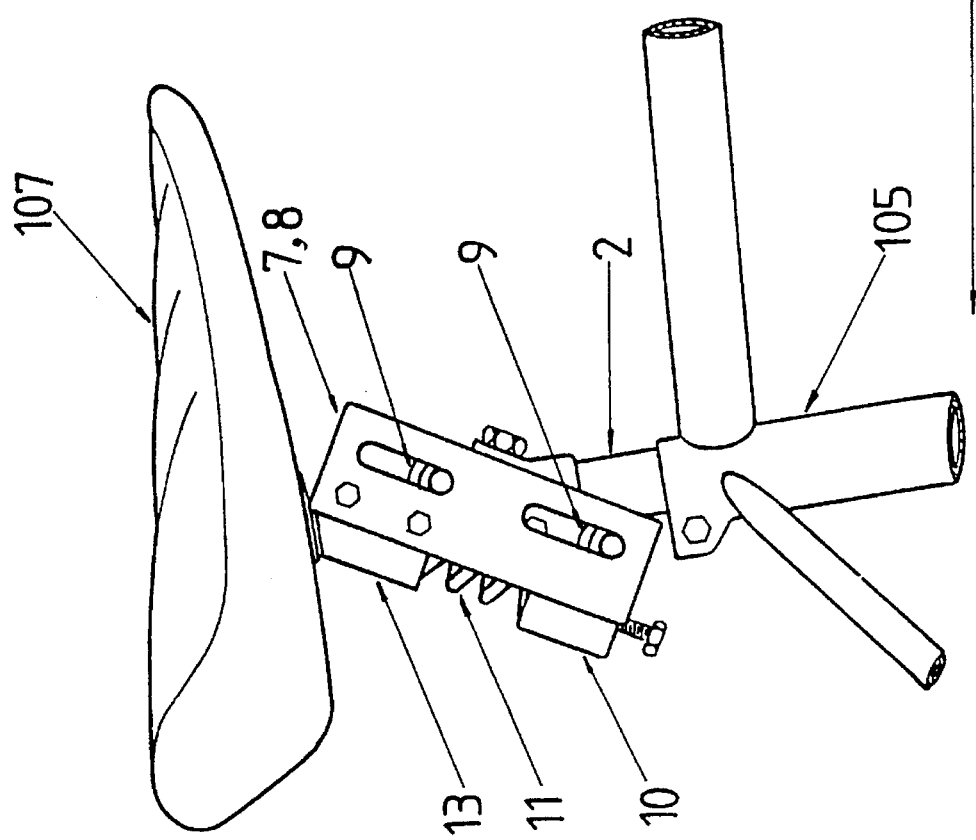

5,529,326

ADJUSTABLE SHOCK ABSORBING DEVICE FOR BICYCLE SEAT

BACKGROUND OF THE INVENTION

Most conventional shock absorbing devices for a bicycle seat are of the 3-point type, i.e., the front point is fixed and does not provide a shock absorbing function and the rear two points utilize spring compression or expansion for providing a shock absorbing function. However, these conventional shock devices for a bicycle seat have two disadvantages:

1. Their shock function depends on an up and down swinging displacement on the rear side of the seat while the front side of the seat remains stationary. Thus, the shock absorbing function is insufficient.

2. Because the shock spring is fixed, if the rider is too heavy it will be compressed and expanded to its limits so the shock absorbing effect is not significant. On the contrary, if the rider is too light, then the spring will be too stiff.

There are two major factors which cause shock to a bicycle during its operation, including a cavity in or a projection on the road. When the wheel runs over a cavity, the rider and bicycle will sink down promptly to cause an up and down shock. When the wheel runs over a projection, the rider and bicycle will experience a longitudinal shock impact. Thus, the shocks caused during operation include vertical and longitudinal shocks due to a series of cavities in and projections on the road.

In view of the foregoing, the invention provides a shock strut for a bicycle seat having a most convenient and effective design, and with the following advantages:

1. It has a shock absorbing function through vertical and longitudinal displacements for absorbing vertical and longitudinal impacts to the bicycle.

2. It can adapt to the need of the rider by properly adjusting the angle of inclination of the seat and the direction of the shock absorbing function.

3. It can adapt to the weight of the rider by appropriately adjusting the compression strength of the shock absorbing spring.

These and other objects and advantages of the present invention will become apparent to those skilled in the art upon considering the following detailed description of the preferred embodiment, together with the accompanying drawings.

BRIEF DESCRIPTION OF THE DRAWINGS

FIG. 3 depicts the components of the adjustable shock strut of the present invention.

FIG. 4 depicts the operation of the adjustable shock strut of the present invention.

DETAILED DESCRIPTION OF THE PREFERRED EMBODIMENT

Figure 1:
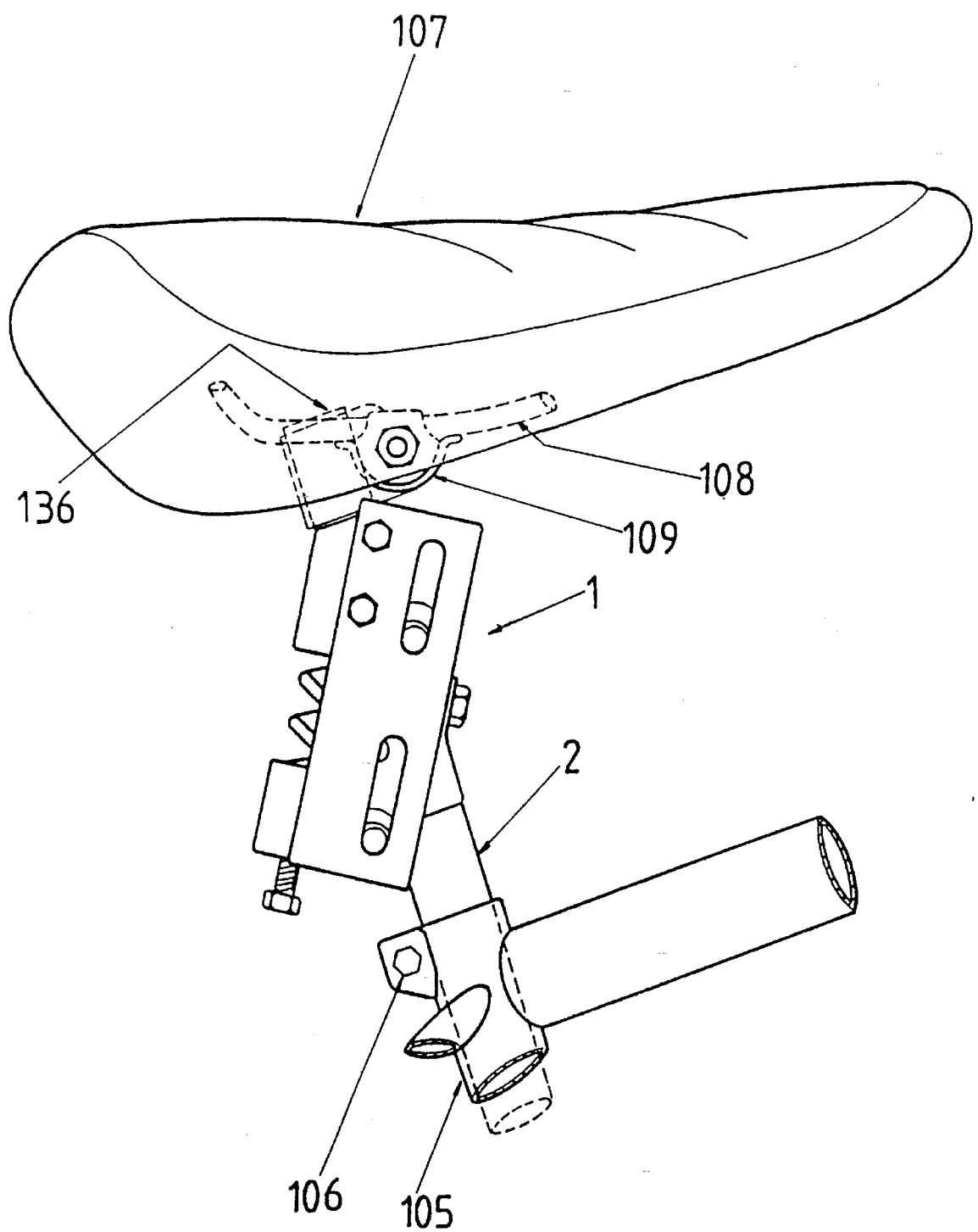
FIG. 1 is a diagrammatic view showing the adjustable shock strut of the present invention mounted on the partially depicted body of a bicycle.

Referring to FIG. 1, the present adjustable shock strut 1 for a bicycle seat is mounted on the body of a bicycle 105, wherein the body 105, seat strut bolt 106, round cable 108 of seat 107 and clamping sheet 109 are conventional devices. The present invention is characterized by an adjustable shock strut device 1 disposed between the seat 107 and the body 105.

Figure 2:
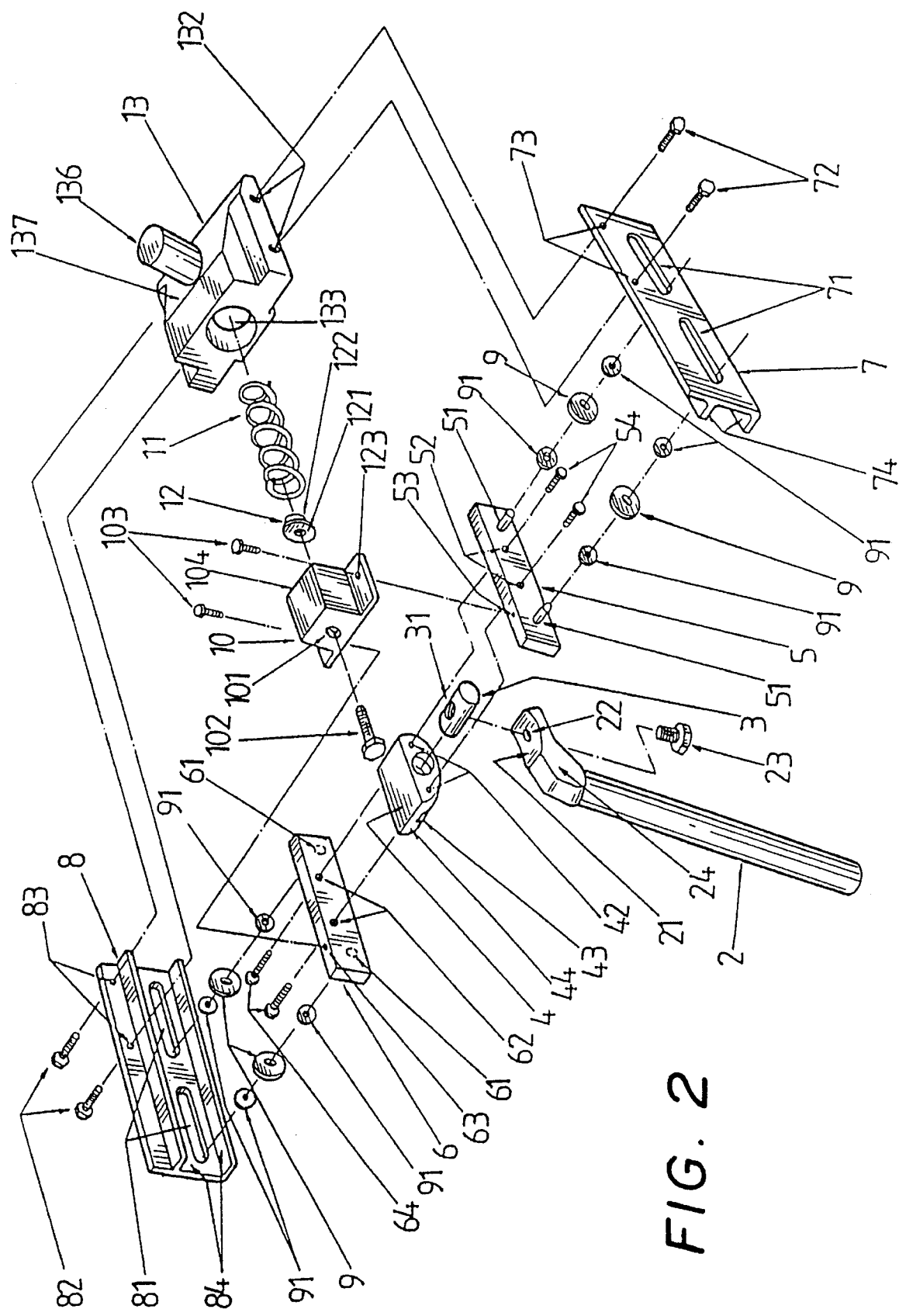
FIG. 2 is an exploded perspective view showing the adjustable shock strut of the present invention.

Referring to FIGS. 2 and 3, the present shock strut device 1 comprises a strut 2, a first or semi-round seat 4, a nut 3, a right wheel plate 5, a left wheel plate 6, four rollers 9, a right slide plate 7, a left slide plate 8, a second or adjustable seat 10, a post cover 12, a compression spring 11, a seat retainer 13, and a plurality of fixing elements.

The strut 2 is a round beam of appropriate length, for insertion in the structural face of the body 105 and fixed by bolt 106. The top end has a strut head 24 with an inverted ring face 21 provided with a center hole 22 therein.

The lower ring face 44 of semi-round seat 4 has a semicircular configuration corresponding with the inverted ring face 21 of strut 2. The ring face 44 is provided with a groove 43, and each side of the semi-round seat 4 is provided with a cylindrical hole 41 extending therethrough and two internal threaded holes 42.

The nut 3 is of cylindrical shape, and its length and outside diameter are slightly smaller than the depth and bore of the hole 41 of semi-round seat 4. The intermediate section of nut 3 has an internal threaded hole 31.

The nut 3 is first inserted in the hole 41 of semi-round seat 4. The semi-round seat 4 is then placed on the top end of strut 2, enabling the lower ting face 44 and inverted ting face 21 to match tightly. Finally, a bolt 23 is inserted in the hole 22 from the lower side of strut head 24 and threadedly engaged within hole 31 to join the strut 2 with the semi-round seat 4.

The right wheel plate 5 corresponds to the relative position of the rider, and the front and rear ends of a right side thereof is each provided with a wheel axle 51. The intermediate section of plate 5 has two holes 52 alignable with the two holes 42 on the corresponding right side of semi-round seat 4. Two screws 54 are used to fix the right wheel plate 5 to the right side of semi-round seat 4. The rear upper end of the plate 5 has an internal threaded hole 53 for fixing the adjustment seat 10.

Likewise, the left side of left wheel plate 6 also has a pair of wheel axles 61 at the front and rear ends thereof, and a pair of holes 62 alignable with the two holes 42 on the left side of semi-round seat 4. Similarly, two screws 64 are used to fix the left wheel plate 6 to the left side of semi-round seat 4. The rear upper end of the plate 6 has an internal threaded hole 63 for fixing the adjustment seat 10.

The four round pads 91 and four rollers 9 are placed on the two axles 51 of right wheel plate 5 and the two axles 61 of left wheel plate 6. The axles 51, 61 are of sufficient length for insertion in the two slot holes of right slide plate 7 and two slot holes 81 of left slide plate 8.

The left side of right side plate 7 has two rolling faces 74 spaced approximately equal in width to the outer diameter of rollers 9, and two slot holes 71 equal to the spacing of the two axles 51 on the right side of plate 5 so the rollers 9 may roll up or down on the rolling faces 74 while the axles 51 may move freely along the slot holes 71, as shown in FIG. 4. The rear top section of the plate 7 has two holes 73 for fixing the seat retainer 13 on the right side. Likewise, the left slide plate 8 has two rolling faces 84, two slot holes 81 and two holes 83, and their relative positions are symmetrical to the right slide plate 7 for performing the same functions.

The seat retainer 13 is of a beveled trapezoidal shape, and the rear center of which has a round socket space 133 for receiving and positioning one end of a shock spring 11. The top of retainer 13 has a bevel face 137, the intermediate part of which is provided with a post structure 136 to match clamping sheet 109 for fixing the seat 107. The front and rear parts of the right and left sides of retainer 13 have threaded holes 132 for receiving the left and right screws 72, 82 to secure the right and left slide plates 7, 8.

The front end of adjustment seat 10 has a round socket space 104 for receiving a post cover 12, the latter engageable by the other end of shock spring 11. A section 122 of cover 12 with a smaller diameter is set in the spring 11. A section 121 with a larger diameter bias a small inverted hole therein so that the compression of spring 11 may be adjusted by engaging the screw 102 into the inverted hole of section 121. A hole 123 on each side flange of the adjustment seat 10 permits the latter to be fixed on the threaded hole 53 of right wheel plate 5 and on the threaded hole 63 of left wheel plate 6 by pair of screws 103.

Referring to FIGS. 2 and 4, when the seat 107 suffers an external shock load, seat retainer 13 will drive the right and left slide plates 7, 8 downward and backward against compression spring 11, thus producing vertical and longitudinal shock absorbing effects. Further, because rollers 9 on the right and left wheel plates 5, 6 are in rolling contact along faces. 74, 84, the shock absorbing effect is highly increased as a result of lowered frictional resistance.

Figure 5:
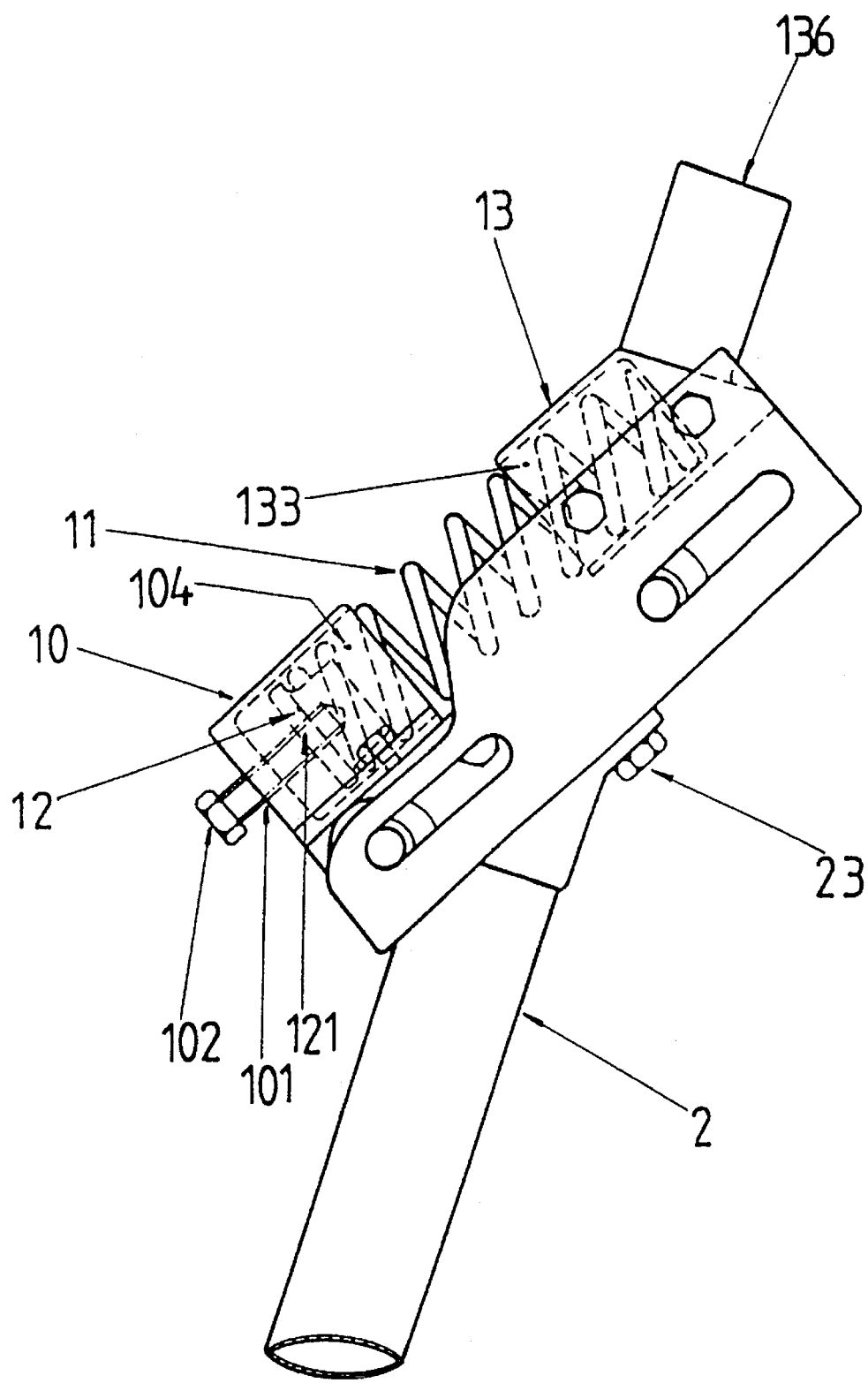
FIG. 5 depicts the adjustable shock strut of the present invention with the entire spring being shown in both solid and broken lines.

Referring to FIG. 5, if the compression strength of shock spring 11 is deemed too low and inadequate, screw 102 may be tightened to push the post cover 12 against spring 11 to increase its compression strength. On the contrary, if the compression strength of shock spring 11 is deemed to high, the adjustment screw 102 is loosened.

The adjustment for the angle of inclination of the seat 107 to the needs of the rider only requires first loosening the bolt 23 of the strut 2 so the seat 107 may be turned as required, then retightening the bolt 23. Turning of seat 107 is made possible because of the design of the groove 43 of semi-round seat 4, the nut 3 and inverted ring face 21 of strut head 24.

I claim:

1. An adjustable shock absorbing device for a bicycle seat comprising:
   a) a strut head for mounting on a top end of a seat strut, the strut head including a first seat secured thereto;
   b) a pair of wheel plates secured to opposite sides of the first seat, roller means carried by each wheel plate and a second seat secured to the wheel plates;
   c) a seat retainer including means for mounting a bicycle seat thereon;
   d) a pair of slide plates secured to opposite sides of the seat retainer, each slide plate including a rolling face engaged by the roller means of a wheel plate for permitting the slide plates and the seat retainer to slide back and forth relative to the wheel plates;
   e) a spring including a first end engaged with the seat retainer and a second end engaged with the second seat for providing sliding resistance to the slide plates;
   f) means carried by the second seat for adjusting the compression strength of the spring; and
   g) wherein, when a shock is applied to the bicycle seat, the seat retainer moves substantially downwardly and is urged against the spring, and the slide plate slides on the roller means for absorbing a shock.

2. The shock absorbing device of claim 1 wherein the strut head further includes:
   a) an inverted ring face and a center hole extending through the ring face and strut head;
   b) the first seat includes a lower ring face for corresponding engagement with the inverted ring face of the strut head to permit the first seat to be turned relative to the strut head;
   c) the lower ring face including a groove formed therein, and a cylindrical nut carded by the first seat; and
   d) a bolt disposed through the center hole of the strut head and engaged with the cylindrical nut for securing the first seat to the strut head and permitting its adjustment to vary the angle of inclination of the bicycle seat.

* * * * *